United States Patent
Marchand et al.

(10) Patent No.: US 8,845,893 B2
(45) Date of Patent: Sep. 30, 2014

(54) FILTER ELEMENTS

(75) Inventors: Roger L. Marchand, St. Albert (CA); Douglas J. Tschetter, St. Albert (CA)

(73) Assignee: Bay 6 Solutions Inc., St. Albert, Alberta (CA)

( * ) Notice: Subject to any disclaimer, the term of this patent is extended or adjusted under 35 U.S.C. 154(b) by 407 days.

(21) Appl. No.: 12/707,847

(22) Filed: Feb. 18, 2010

(65) Prior Publication Data

US 2011/0094956 A1 Apr. 28, 2011

(51) Int. Cl.
*B01D 35/06* (2006.01)

(52) U.S. Cl.
USPC .................. 210/222; 201/223; 201/695

(58) Field of Classification Search
USPC ............................. 210/222, 223, 695
See application file for complete search history.

(56) References Cited

U.S. PATENT DOCUMENTS

| | | | |
|---|---|---|---|
| 2,331,769 A * | 10/1943 | Frantz | 209/224 |
| 3,136,720 A * | 6/1964 | Baermann | 210/222 |
| 4,303,504 A * | 12/1981 | Collins | 209/223.1 |
| 4,857,188 A * | 8/1989 | Aisa et al. | 210/222 |
| 4,883,591 A | 11/1989 | Belasco | |
| 5,045,184 A * | 9/1991 | Arkles | 209/405 |
| 6,143,171 A | 11/2000 | Van Aarsen | |
| 6,558,541 B1 * | 5/2003 | Morrison | 210/222 |
| 6,706,178 B2 * | 3/2004 | Simonson | 210/222 |
| 6,833,069 B1 | 12/2004 | Asterlin | |
| 6,835,308 B2 | 12/2004 | Elsegood | |
| 7,427,352 B2 | 9/2008 | Naito | |
| 7,712,455 B2 * | 5/2010 | Szalai | 123/538 |

FOREIGN PATENT DOCUMENTS

CA 2331559 7/2002

* cited by examiner

*Primary Examiner* — Tony G Soohoo
*Assistant Examiner* — Peter Keyworth
(74) *Attorney, Agent, or Firm* — Davis & Bujold, PLLC; Michael J. Bujold

(57) ABSTRACT

A filter element has a non-magnetic frame defining a fluid flow opening. The non-magnetic frame has at least one mounting surface for mounting against a ferrous material. Two or more magnet-enclosing channels are supported by the non-magnetic frame. Two or more permanent magnets are provided within each magnet-enclosing channel. The permanent magnets are arranged with opposite poles facing one another. The permanent magnets apply a magnetic force through the at least one mounting surface to support the non-magnetic frame on the ferrous material.

8 Claims, 6 Drawing Sheets

FILTER ELEMENTS

FIELD

This relates to filter elements such as elements that may be magnetically installed within a fluid system.

BACKGROUND

In closed loop fluid systems, it is often necessary to filter the fluids, such as in engine lubrication systems, hydraulic equipment or other mechanical devices, in order to remove debris from the fluid. In engines, hydraulic equipment and mechanical devices, the debris is often metal worn off of moving parts. Magnetic filters, such as the one described in U.S. Pat. No. 6,706,178 (Simonson) entitled "Magnetic Filter and Magnetic Filtering Assembly".

SUMMARY

There is provided a filter element, comprising a non-magnetic frame defining a fluid flow opening. The non-magnetic frame has at least one mounting surface for mounting against a ferrous material. Two or more magnet-enclosing channels are supported by the non-magnetic frame. Two or more permanent magnets are positioned within each magnet-enclosing channel. The permanent magnets are arranged with opposite poles facing one another, the permanent magnets applying a magnetic force through the at least one mounting surface to support the non-magnetic frame on the ferrous material.

There is also provided a modular filter, comprising more than one filter element as described above with a first side of the non-magnetic frame comprising a magnet-enclosing channel, and a second side of the non-magnetic frame comprising a magnet-enclosing channel or a ferrous material enclosing channel. The filter elements are assembled by magnetically attaching the first side of a filter element to the second side of an adjacent filter element.

There is also provided a method of installing a filter element in a fluid tank, the fluid tank having a ferrous metal housing, a fluid input, and a fluid output. The method comprising the steps of providing at least one filter element as described above; and inserting the filter element into the fluid tank such that one of the mounting surfaces of at least one filter element is adjacent to, and magnetically attracted to, the ferrous metal housing and such that at least a portion of the fluid passing from the fluid input to the fluid output passes through the fluid flow opening.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
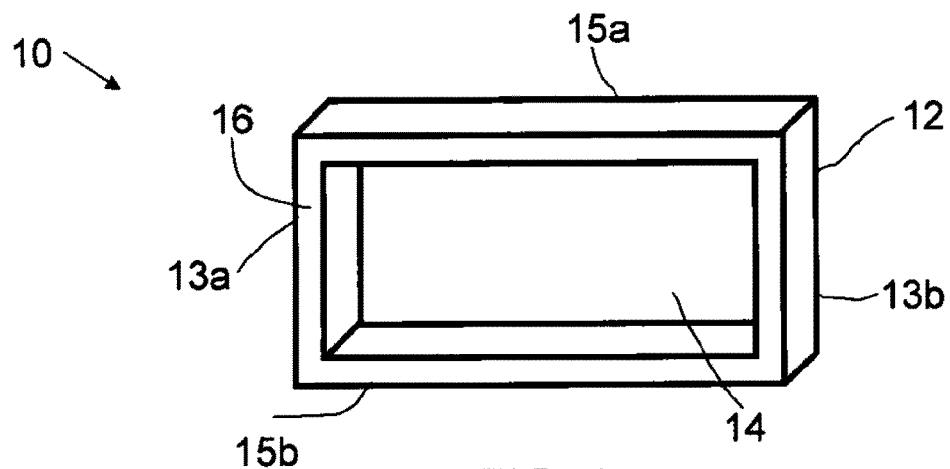
FIG. 1 is a perspective view of a filter element.
Figure 4:
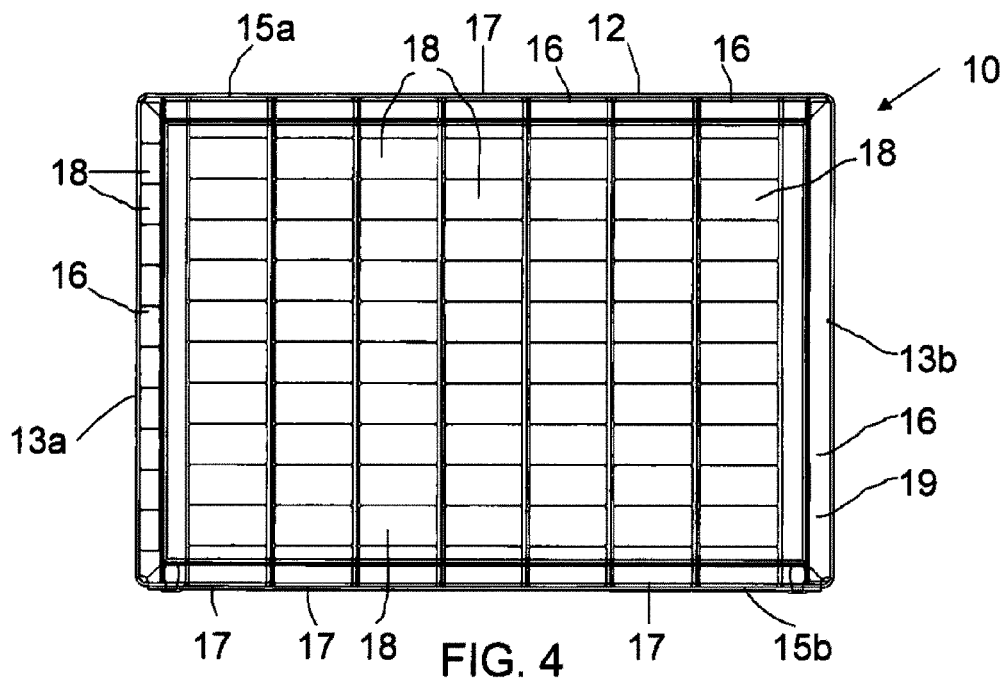
FIG. 4 is a transparent side elevation view of a filter element.
Figure 11:
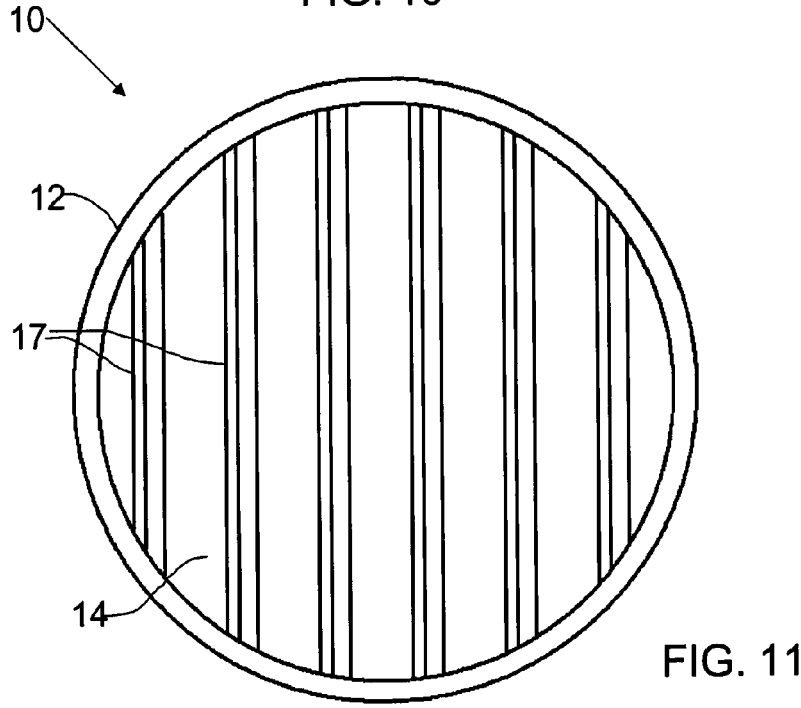
FIG. 11 is a top plan view of an alternate design of a filter element.

A filter element generally identified by reference numeral 10, will now be described with reference to FIG. 1 through 13.
Structure and Relationship of Parts:

Referring to FIG. 1, a filter element 10 includes a non-magnetic frame 12 with multiple sides 13a, 13b 15a and 15b defining a fluid flow opening 14. It will become apparent from the discussion below that other shapes other than rectangles may be used, such as other polygons, or curved or partially curved frames, depending on the preferences of the user and the intended use of filter element 10. An example of a curved frame is shown in FIG. 11. Referring to FIG. 4, side 13a includes a magnet-enclosing channel 16 and a plurality of permanent magnets 18 positioned within it. The opposite side 13b may enclose magnets or, as shown, a piece of ferrous material 19, which allows it to be magnetically connected to other filter elements 10 in a modular fashion without any repulsive forces. In the depicted design, top and bottom sides 15a and 15b are used simply to secure magnet enclosing channels 17 by engaging them in openings, but do not form magnet enclosing channels themselves. In filter element 10, at least one side is intended for use as a mounting surface, where magnets 18 that are adjacent to this side apply a sufficient attractive force that filter element 10 may be mounted to a surface. This may be done by a magnet enclosing channel 16 along that side, or by magnets 18 in the end of a channel 16 or 17 that terminates at that side. In addition, frame 12 need not have square surfaces. For example, referring to FIG. 13, bottom side 15b may be slanted, such that when installed, frame 12 is at an angle, or is attached to an angled surface to remain upright.

In each channel 16 and 17, permanent magnets 18 are arranged with opposite poles facing one another. The common approach in the field is to place like poles facing each other to create a more widely dispersed, albeit weaker, magnetic field. By placing opposite poles together, a stronger magnetic field that is more localized around filter element 10 is created. This allows smaller particles to be pulled from the fluid, and also increases the holding power on the particles. Preferably, the magnets 18 are rare earth magnets, such as NdFeB magnets, or other strong magnets. In one test product, particles down to 1 um were found on the test filter element using NdFeB magnets. If used in high-temperature applications, such as in an engine, gear box or hydraulic equipment, magnets 18 must be able to maintain sufficient magnetism in the high temperatures that will be encountered. It will be understood that not all channels 16 need to include magnet-enclosing channels 16, but it is preferred that they do as this increases the filtering capacity of element 10.

Figure 2:
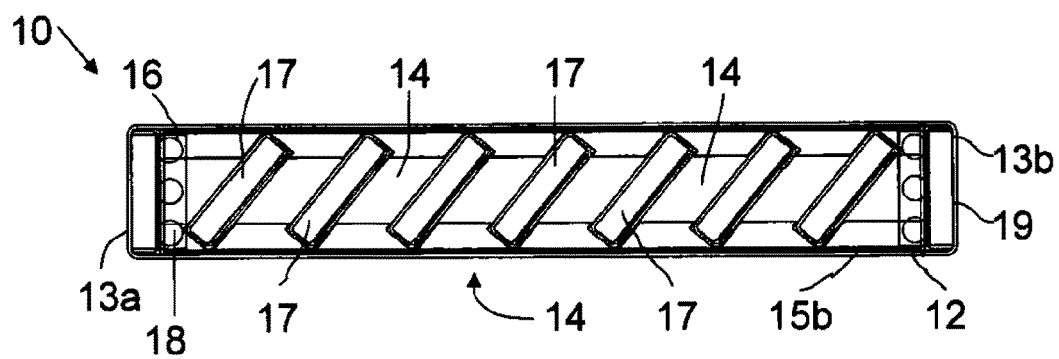
FIG. 2 is a top plan view in section of a filter element.
Figure 6:
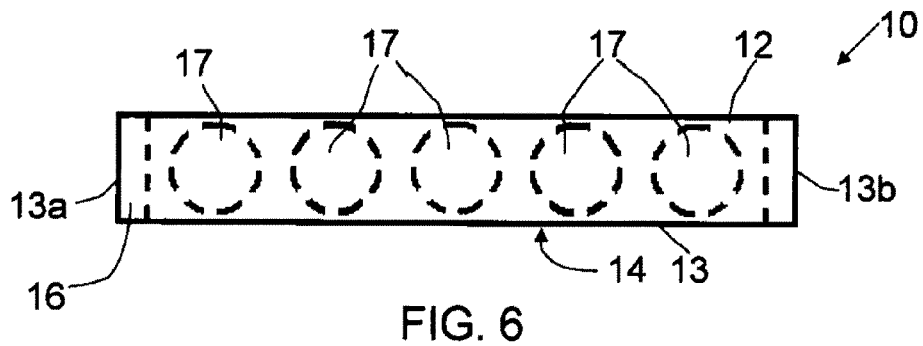
FIG. 6 is a partially transparent top plan view of a filter element.

Filter element 10 has an open flow opening 14. In the embodiment shown in FIG. 1, frame 12 is made from magnet enclosing channels 16. However, referring to FIGS. 2 and 4, other magnet-enclosing channels 17 may be included that traverse flow opening 14. As mentioned above, in this situation top and bottom 15a and 15b are used to secure channels 17. With channels 17 present, sides 13a and 13b do not need to contain have channels 16, although they may be used to increase the filter capabilities and to allow adjacent filter elements 10 to be attached, as will be described. In FIG. 2, magnet-enclosing channels 17 have a rectangular cross-section and are louvered. In this example, the entire flow opening 14 may be covered. However, in order to reduce the flow restrictions, louvered channels 17 may not cover the entire flow opening 14, as shown in FIG. 11. In FIG. 6, magnet-enclosing channels 17 are circular and are evenly spaced within fluid flow opening 14. Other designs may also be used, such as a staggered design, or perpendicular design. The louvered design depicted in FIG. 2 is preferred for most applications, as it does not restrict the flow area as much as FIG. 6. Also, the design creates some turbulence in the fluid flow, which causes more fluid to come into close proximity to a magnetic element 18, and therefore increases the probability that a contaminant will be magnetically filtered. The design of element 10, the size and spacing of channels 17, if any, may vary depend on the fluid flow characteristics and the sensitivity of the equipment to particles. For example, more sensitive equipment may have higher filtering requirements, and therefore may require a higher density of magnets 18. Other equipment may not have as high of sensitivity, but may have less tolerance for flow restriction, and therefore fewer channels 17 may be required.

Figure 12:
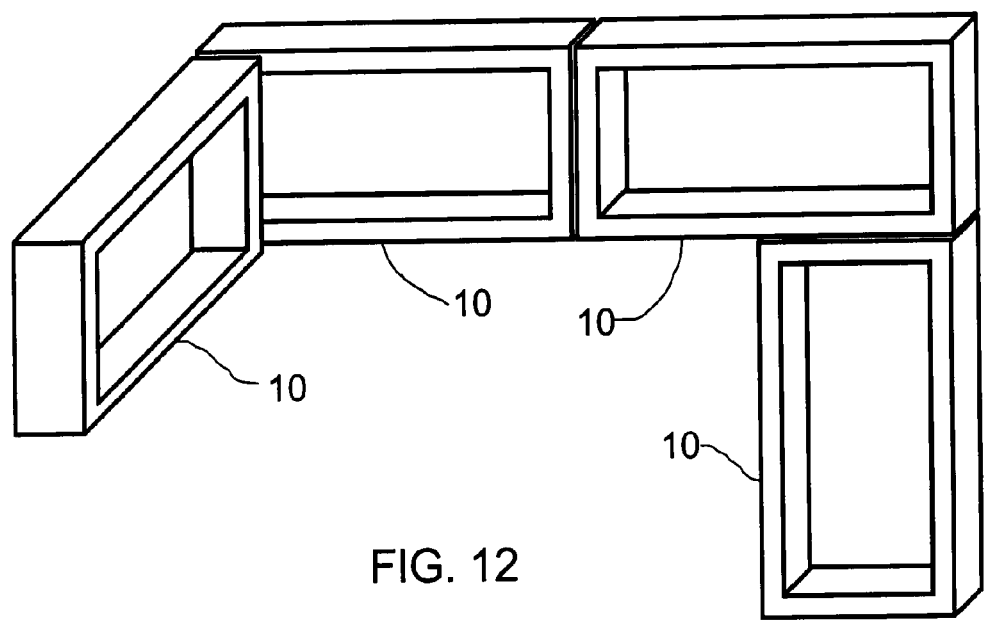
FIG. 12 is a perspective view of a modular design.
Figure 13:
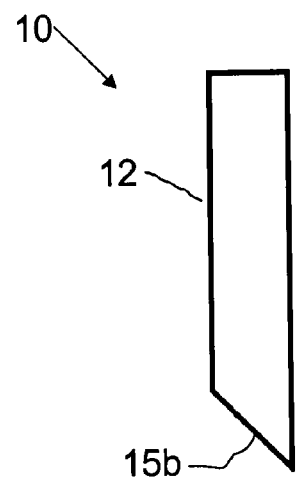
FIG. 13 is a side view of a frame.

The profile of element 10 may be adjusted to suit the space and shape requirements of a particular confinement. For example, the size may be adjusted to suit a particular opening. If a rectangular frame 12 is used, then the length or width may be adjusted accordingly. It will be understood that frame 12 need not be rectangular, and that other polygons, round shapes or combinations may be used. For example, FIG. 11 shows a filter element 10 that may be used to cover a round outlet or inlet similar to a grate. In a preferred embodiment, to reduce the costs, filter elements 10 are preferably modular to allow them to be attached in various configurations using a set of basic building blocks. An example of this is shown in FIG. 12, where it can be seen that filter elements 10 may be attached in a side-by-side arrangement, above or below, or at an angle. It is preferred that a magnet-enclosing channel 16 is placed adjacent to a ferrous material 19 to prevent channels 16 repelling each other. The modular capabilities allow filters to be formed that are more easily and more safely installed. For example, an opening may have a limited size, such that only elements of a certain size can be introduced or manipulated when introduced inside an enclosure. Alternatively, the size of the required filter may be too large to handle safely in a single piece. The modular design allows the required filter to be assembled in place.

Figure 10:
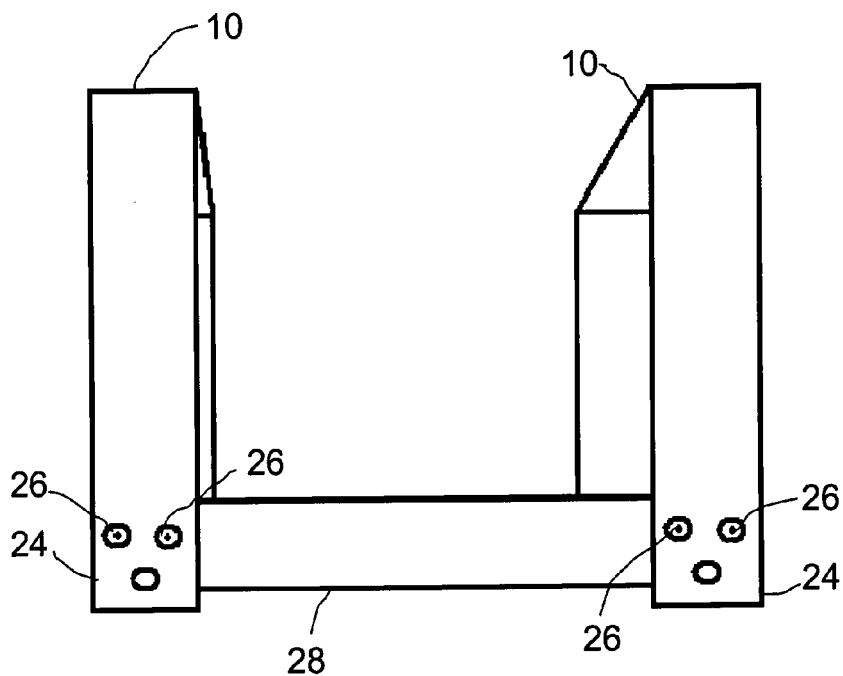
FIG. 10 is an elevated perspective view of a filter element with brackets.

Referring to FIG. 10, filter elements 10 may include a bracket 24 to allow elements 10 to be attached, for example, by rivets to a spacer 28. This allows more versatility in the shapes that filter elements 10 may take. Alternatively, spacer 28 may include ferrous material, such that the spacer is attached magnetically. In that case, profiles may be provided to receive the connecting components to ensure proper placement and prevent unwanted movement.

Figure 3:
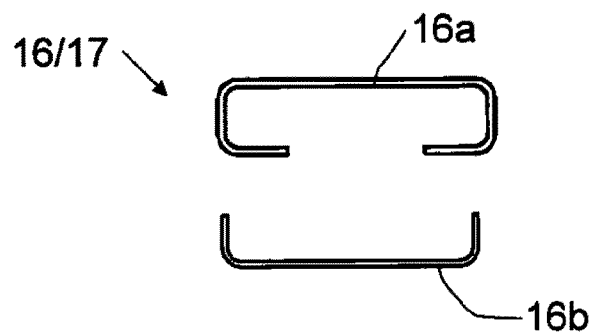
FIG. 3 is an exploded view of a magnet-enclosing channel.
Figure 8:
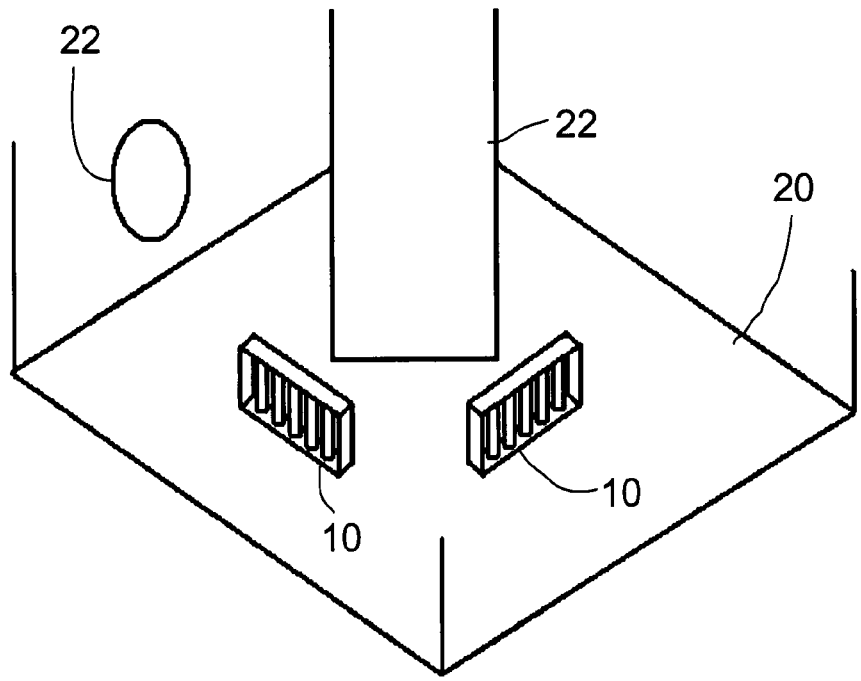
FIG. 8 is a perspective view of filter elements installed around a conduit.
Figure 9:
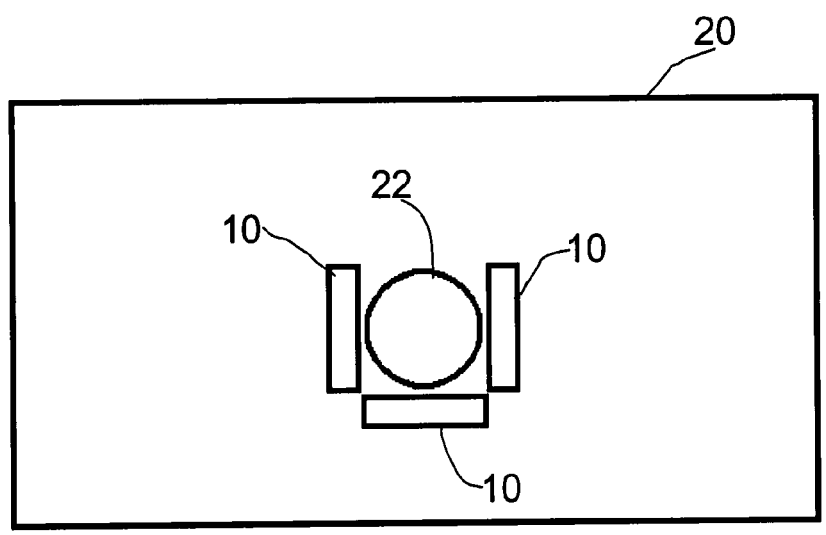
FIG. 9 is a top plan view of filter elements installed around a conduit.

Operation:

Referring to FIG. 1 through 5, filter element 10 is comprised mostly of channels 16 and 17. As shown in FIG. 3, channels 16 and 17 may be made from two parts 16a and 16b to isolate the magnets that it will house from the debris in the fluid. Referring to FIG. 8, a filter element 10 is placed in a tank 20, or other enclosure. The filter element 10 may be moved into a variety of different positions, however it is most effective if placed in close proximity to a conduit 22. Referring to FIG. 9, more than one filter element 10 may be placed in a tank 20 such that it surrounds a conduit 22. As filter elements 10 contain magnets 18, they may be installed in a desired position using the attractive forces between magnets 18 and tank 20. By relying on the magnetic forces, installation can be done with relatively little training, with no specialized tools, and without modifying tank 20 or other enclosure. They are also relatively easy to remove, without having to worry about, for example, pin connectors that may become worn, stuck or stripped during use. Filter elements 10 may be made in a variety of shapes and sizes, and as they are attached to tank 210 or each other using magnets, they are quite versatile in where they are installed. Furthermore, as the attachment is magnetic, they may be slid into the desired position along a ferrous surface, but it becomes very difficult to remove away from the ferrous metallic surface. One or more filters 10 are provided such that a desired amount of fluid comes into contact with the magnetic fields of magnets 18 in filters 10.

Figure 7A:
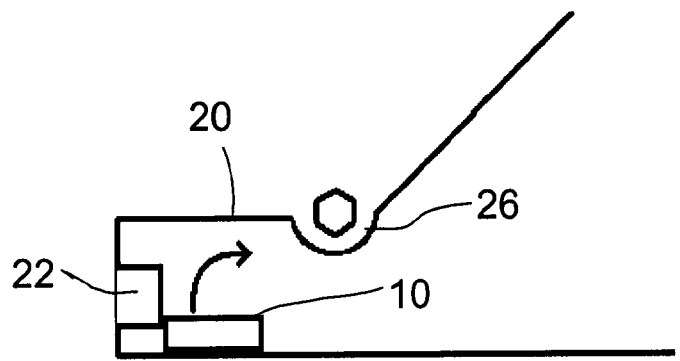
FIG. 7A through 7C are side elevation views of a series of steps showing a filter element being installed.
Figure 7B:
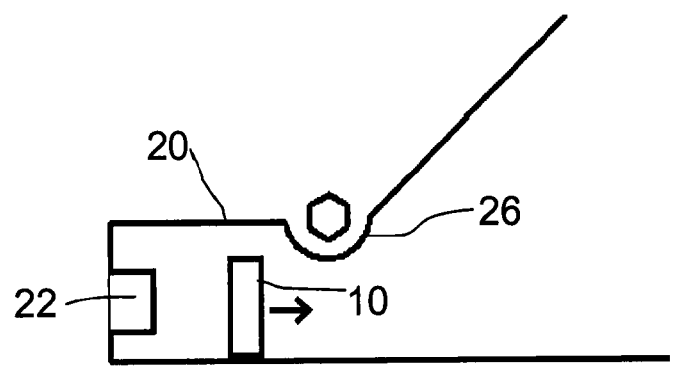
Figure 7C:
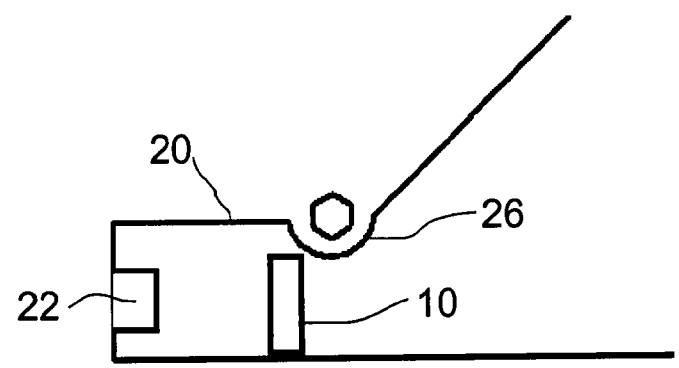

An example is shown in FIG. 7A through 7C, which filter element 10 being positioned in tank 20 using a series of steps. In tank 20, there is an overhead boss 26. Referring to FIG. 7A, filter element 10 is placed on its side and slid under boss 26 toward conduit 22. Referring to FIG. 7B, once properly positioned inside tank 20, filter element 10 is rolled into an upright position and slid into a place. Referring to FIG. 7C, filter element 10 is thus positioned in tank 20 such that a maximum amount of material to be filtered must pass through the filter element 10. Multiple filters 10 may be positioned in a side-by-side relationship to fill the opening.

Figure 5:
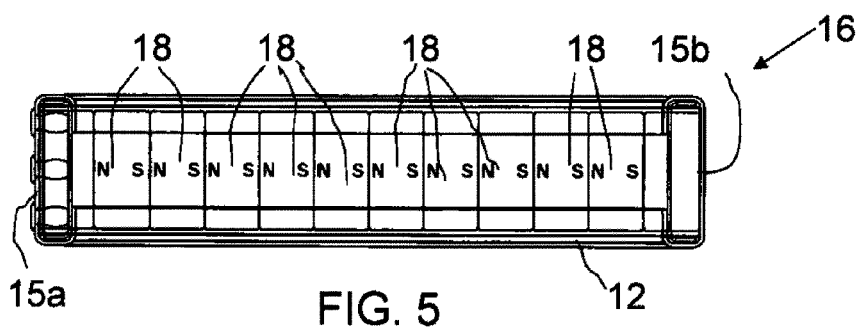
FIG. 5 is a transparent side elevation view of a magnet-enclosing channel.

Referring to FIG. 5, magnet-enclosing channels 16 contain a plurality of magnets 18 arranged with opposite poles facing one another. The magnets are contained by frame 12. Referring to FIG. 4, multiple magnet-enclosing channels 16 are utilized in filter element 10.

Referring to FIG. 2, a filter element 10 filters fluid through the fluid flow openings 14 created by sides 13 of the housing 12. Magnet-enclosing channels 16 are positioned such that the fluid passing through the fluid flow openings 14 comes into close proximity of the magnets 18 housed in the magnet-enclosing channels 16. The magnets 18 attract magnetic particles and pull them out of the fluid to be filtered.

The non-magnetic enclosures help facilitate cleaning, typically by pressure washing techniques, when required.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A filter element for magnetically filtering ferrous material from a fluid flow, comprising:

a rectangular non-magnetic frame having an inner surface defining a fluid flow opening, and at least one outer mounting surface opposite the inner surface for mounting against a ferrous material;

at least two peripheral sides of the rectangular non-magnetic frame comprising channels, each channel defining a frame magnet-isolating cavity;

at least one louvered channel spaced from the peripheral sides of the rectangular non-magnetic frame and traversing the fluid flow opening, the louvered channel defining a louvered channel magnet-isolating cavity; and two or more permanent magnets within the frame magnet-isolating cavity of each of the channels and the at least one louvered channel magnet-isolating cavity, such that the magnets are physically isolated within the respective magnet-isolating cavity from the fluid flow.

2. The filter element of claim 1, wherein at least one side of the non-magnetic frame comprises a channel that encloses a ferrous metal.

3. The filter element of claim 1, wherein the at least one louvered channel defines a flow path that is angled relative to the fluid flow opening of the frame.

4. The filter element of claim 1, wherein the permanent magnets are rare earth magnets.

5. A modular filter, comprising:

more than one filter element, each filter element comprising:

a rectangular non-magnetic frame having an inner surface defining a fluid flow opening, and at least one outer mounting surface opposite the inner surface for mounting against a ferrous material;

at least two peripheral sides of the rectangular non-magnetic frame comprising channels, each channel defining a frame magnet-isolating cavity;

at least one louvered channel spaced from the peripheral sides of the rectangular non-magnetic frame and traversing the fluid flow opening, the louvered channel defining a louvered channel magnet-isolating cavity;

two or more permanent magnets within the frame magnet-isolating cavity of each of the channels and the at least one louvered channel magnet-isolating cavity, such that the magnets are physically isolated within the respective magnet-isolating cavity from the fluid flow; and the filter elements being assembled by magnetically attaching one of the mounting surfaces of a filter element to an adjacent filter element.

6. The modular filter of claim 5, wherein the non-magnetic frame of at least one filter element has a different size than another filter element.

7. A method of installing a modular filter in a fluid tank, the fluid tank having a ferrous metal housing, a fluid input, and a fluid output, the method comprising the steps of:

providing more than one filter element, each filter element comprising:

a rectangular non-magnetic frame having an inner surface defining a fluid flow opening, and having more than one mounting surface opposite the inner surface for mounting against a ferrous material;

at least two peripheral sides of the rectangular non-magnetic frame comprising channels, each channel defining a frame magnet-isolating cavity;

at least one louvered channel spaced from the peripheral sides of the rectangular non-magnetic frame and traversing the fluid flow opening, the louvered channel defining a louvered channel magnet-isolating cavity; and two or more permanent magnets within the frame magnet-isolating cavity of each of the channels and the at least one louvered channel magnet-isolating cavity, such that the magnets are physically isolated within the respective magnet-isolating cavity from the fluid flow, and the at least one louvered channel defining a flow path that is angled relative to the fluid flow opening of the frame;

assembling the modular filter by magnetically attaching one of the mounting surfaces of a filter element to an adjacent filter element; and inserting the modular filter into the fluid tank such that one of the mounting surfaces of at least one filter element is magnetically secured to an inner surface of the ferrous metal housing and such that at least a portion of the fluid passing from the fluid input to the fluid output passes through the fluid flow opening.

8. The method of claim 7, wherein the permanent magnets are rare earth magnets.

* * * * *